United States Patent
Kirshenbaum et al.

(10) Patent No.: US 10,071,398 B2
(45) Date of Patent: Sep. 11, 2018

(54) MULTI-LAYER COATED SUBSTRATES AND METHODS FOR FORMING MULTI-LAYER COATINGS ON SUBSTRATES

(71) Applicant: AXALTA COATING SYSTEMS IP CO., LLC, Wilmington, DE (US)

(72) Inventors: Kenneth Kirshenbaum, West Bloomfield, MI (US); Peter W. Uhlianuk, Romeo, MI (US)

(73) Assignee: AXALTA COATING SYSTEMS IP CO. LLC, Wilmington, DE (US)

( * ) Notice: Subject to any disclaimer, the term of this patent is extended or adjusted under 35 U.S.C. 154(b) by 71 days.

(21) Appl. No.: 14/505,603

(22) Filed: Oct. 3, 2014

(65) Prior Publication Data

US 2016/0096974 A1    Apr. 7, 2016

(51) Int. Cl.
| | |
|---|---|
| *B05D 3/02* | (2006.01) |
| *C09D 133/14* | (2006.01) |
| *B05D 7/00* | (2006.01) |
| *C09D 4/00* | (2006.01) |
| *B05D 7/16* | (2006.01) |
| *B05D 1/02* | (2006.01) |

(52) U.S. Cl.
CPC ........... *B05D 7/572* (2013.01); *B05D 3/0254* (2013.01); *C09D 4/00* (2013.01); *C09D 133/14* (2013.01); *B05D 1/02* (2013.01); *B05D 7/16* (2013.01)

(58) Field of Classification Search
CPC .............................. B05D 7/572; B05D 7/577
See application file for complete search history.

(56) References Cited

U.S. PATENT DOCUMENTS

| | | | |
|---|---|---|---|
| 6,419,989 B1 * | 7/2002 | Betz ...................... | B05D 7/574 427/385.5 |
| 2006/0128901 A1 * | 6/2006 | Ramesh ............... | C08F 220/06 525/327.6 |
| 2013/0142956 A1 * | 6/2013 | Uhlianuk ............... | B05D 7/572 427/385.5 |

* cited by examiner

*Primary Examiner* — Ramsey E Zacharia
(74) *Attorney, Agent, or Firm* — Lorenz & Kopf, LLP

(57) ABSTRACT

A method for forming a multi-layer coating includes the step of sequentially applying a layer of a primer coating composition, a layer of a base coating composition, and a layer of a clear coating composition on a substrate. The clear coating composition includes a film forming binder and an organic liquid carrier. The film forming binder includes at least one monomer unit including the condensation product of an ethylenically unsaturated carboxylic acid group and glycidyl ester of a mixture of tertiary acids having 9 to 11 carbon atoms having at least one methyl group on the α-carbon. The method further includes the step of simultaneously curing the applied three layers by baking.

13 Claims, 1 Drawing Sheet

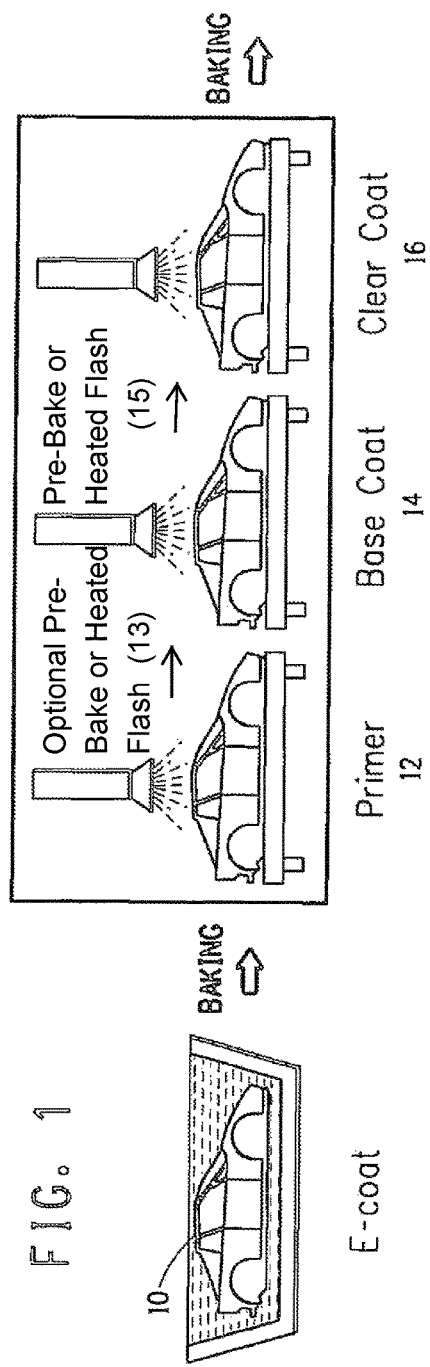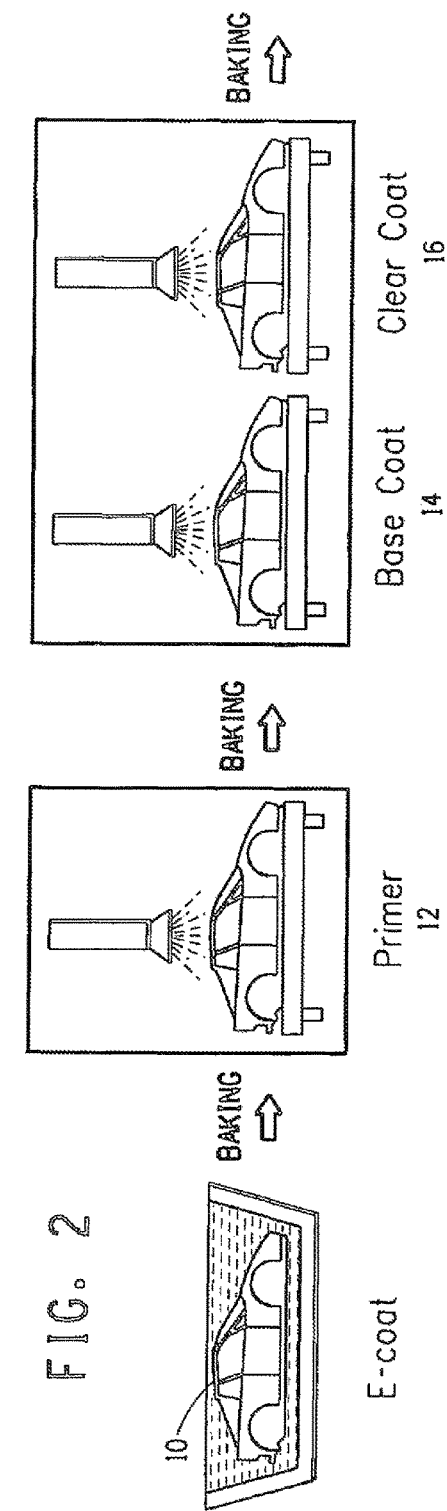
FIG. 1
FIG. 2 PRIOR ART

MULTI-LAYER COATED SUBSTRATES AND METHODS FOR FORMING MULTI-LAYER COATINGS ON SUBSTRATES

TECHNICAL FIELD

The present disclosure generally relates to coating compositions. More particularly, the present disclosure relates to multi-layer coated substrates and methods for forming multi-layer coatings on substrates.

BACKGROUND

Coating systems for automobiles normally include a multiplicity of coatings applied to a steel substrate. Typically, the steel is treated with a rust-proofing phosphate layer, then a cathodic electro-coat primer for additional corrosion protection is applied. A primer-surfacer (also known as a chip resistant primer, primer, or primer filler) is used next to smooth the surface for top-coating and also to provide stone chipping resistance to the coating system during the normal course of driving. Then a top-coat system is applied, sometimes as a single colored coat, more often now as a basecoat with solid color or flake pigments followed by a transparent protective clear coat, to protect and preserve the attractive aesthetic qualities of the finish on the vehicle even on prolonged exposure to the environment or weathering.

Coating film formation of the basecoat and the clearcoat is normally achieved by wet-on-wet application, which is to say that the clearcoat is applied to the basecoat without baking the basecoat prior to clearcoat application (although the basecoat may be flash dried for a short period of time at room temperature prior to clearcoat application), and then subsequently baking the basecoat and clearcoat at the same time to form a dried and cured finish. In the conventional method for forming the multi-layer coating film, the underlying primer surfacer layer, however, is baked before being top-coated with basecoat and clearcoat. Historically, baked primers have been used not only to provide a smooth surface on which to apply the topcoat, but also to prevent interfacial bleeding or intermixing with the overlying basecoat and avoid disrupting the appearance of the overall topcoat finish. Resistance to intermixing (sometimes referred to as "strike-in" resistance) is especially important for the appearance of glamour metallic finishes which are very popular nowadays on automobiles and trucks. Any disturbance of the metallic pigment flake orientation in metallic basecoats after application over the primer-surfacer will detract from the metallic effect of the finish. Therefore, care must be taken to ensure that the metal pigment flakes are not disturbed after painting.

In recent years, it has also been strongly desired to reduce the environmental load or impact of automotive assembly plants by reducing VOC (volatile organic compounds) emissions and $CO_2$ (carbon dioxide) emissions generated from operating painting booths and baking ovens. This has led to use of lower solvent content in the paint and the development of three-layer wet paint systems which make it possible to apply a primer surfacer, basecoat, and clearcoat wet-on-wet continuously before they are cured all at once in a single bake. With this simplified application process, it is possible to eliminate the separate primer painting booth and primer oven, which also results in substantial cost savings to the automobile manufacturers. The technical hurdles of this process simplification, however, have been significant. For instance, interfacial bleeding and aesthetic appearance, such as surface smoothness, as well as film properties such as chip resistance, are still significant concerns.

Attempts have been made to address the forgoing problems by modifying the formulation of the primer coating material. For example, some prior art methods for forming a multilayer automotive coating film use a three layer wet paint process (also referred to as a "3 wet" or a "3-coat-1-bake" process) wherein a standard polyester-melamine primer coating is formulated to also contain acrylic polymer particles, namely in the form of internally crosslinked non-aqueous dispersion (NAD) polymers or internally crosslinked microgel particles. These particles are intended to raise the viscosity and solubility parameter between the primer surfacer and the base coating to prevent intermixing at the interface between the coated layers. However, use of such particle-filled systems also suffers from some drawbacks.

For example, the microparticles also tend to create voids in the surface of the wet primer where the basecoat can still flow in and intermix, resulting in defects in the aesthetic appearance such as loss of smoothness, gloss, head on brightness, and/or metallic effect. Sagging of these coatings, especially on vertical panels, such as doors, fenders, rocker panels, etc., is also a problem. These particle-filled systems are also not able to maintain dry film builds at normal commercial levels. Film builds must therefore be reduced to allow the NAD or microgel particle to migrate to the interface. Yet, thin films are an impediment as they tend to subject the underlying corrosion-protective electrocoated primer layer to excessive UV light transmission and deterioration. Thin films or thin film regions are also inadequate for mechanical properties and visual appearance of the overall finish.

Accordingly, it is desirable to provide a more effective way to improve the aesthetic appearance and surface smoothness of primer surfacer, basecoat, and clearcoat layers when applied in a wet on wet on wet (i.e., a "3 wet") manner and make it possible to eliminate the primer baking process and reduce the environmental impact of the coating system, while also maintaining film builds, the overall appearance such as high gloss and distinctness of image and film properties of the coating system.

BRIEF SUMMARY

Multi-layer coated substrates and methods for forming multi-layer coatings on substrates are disclosed herein. In one exemplary embodiment, a method for forming a multi-layer coating includes sequentially applying a layer of a primer coating composition, a layer of a base coating composition, and a layer of a clear coating composition on a substrate. The clear coating composition includes a film forming binder and an organic liquid carrier. The film forming binder includes at least one monomer unit including the condensation product of an ethylenically unsaturated carboxylic acid group and glycidyl ester of a mixture of tertiary acids having 9 to 11 carbon atoms having at least one methyl group on the α-carbon. The method further includes simultaneously curing the applied three layers by baking.

In another exemplary embodiment, a multi-layer coated substrate includes a substrate, a layer of a primer coating composition disposed over and in contact with the substrate, a layer of a base coating composition disposed over and in contact with the primer coating composition, and a layer of a clear coating composition disposed over and in contact with the base coating composition. The clear coating composition includes a film forming binder and an organic liquid carrier. The film forming binder includes at least one monomer unit including the condensation product of an ethylenically unsaturated carboxylic acid group and glycidyl ester of a mixture of tertiary acids having 9 to 11 carbon atoms having at least one methyl group on the α-carbon. Each of the primer coating composition, the base coating composition, and the clear coating composition are disposed on the substrate in a "wet" or un-cured state.

BRIEF DESCRIPTION OF THE DRAWINGS

The present disclosure will hereinafter be described in conjunction with the following drawing figures, wherein like numerals denote like elements, and wherein:

FIG. 1 is a schematic diagram of a three-layer wet paint application process in accordance with some embodiments of the present disclosure; and FIG. 2 is a schematic diagram of a conventional automotive coating process that requires a separate primer spray booth and primer baking process.

DETAILED DESCRIPTION

The following detailed description is merely illustrative in nature and is not intended to limit the embodiments of the subject matter or the application and uses of such embodiments. Furthermore, there is no intention to be bound by any expressed or implied theory presented in the preceding technical field, background, brief summary or the following detailed description.

The present disclosure now provides a method and a primer coating composition for forming a multi-layered coating on a substrate, which is capable of forming a smooth-appearance finish on the substrate when a primer coating, a base coating, and a clear coating are applied sequentially over each other in a wet-on-wet (i.e., wet-on-wet-on-wet) manner on the substrate before being baked together, while still meeting today's performance requirements such as good appearance, chip performance, and film builds.

More particularly, the present disclosure provides a method for forming a multi-layer coating of automotive quality and appearance on a substrate without the need for a primer bake and the need to reduce film builds below normal commercial levels, including the steps of sequentially applying a layer of a primer coating composition, a layer of a basecoating composition, and a layer of a clear coating composition in a wet-on-wet manner on an automotive substrate, such as over the entire vehicle body or part thereof, preferably on which an electrodeposition coated film has been formed, and simultaneously curing the applied three layers by baking, wherein the clearcoat coating composition includes: a film-forming binder and an organic liquid carrier, the film-forming binder including a copolymer that has at least one monomer unit including the condensation product of an ethylenically unsaturated carboxylic acid group and glycidyl ester of a mixture of tertiary acids having 9 to 11 carbon atoms having at least one methyl group on the α-carbon. In an exemplary embodiment, at least one monomer unit includes the polymerization product of the condensation product of a polymerizable glycidyl ester or ether and a mixture of tertiary acids having 9 to 11 carbon atoms having at least one methyl group on the α-carbon. Further examples of polymerizable acids include, without limitation, acrylic acid, methacrylic acid, crotonic acid, fumaric acid, maleic acid, and itaconic acid, and anhydrides and monoalkyl esters of the difunctional acids. Further examples of polymerizable glycidyl esters and ethers include, without limitation, glycidyl acrylate, glycidyl methacrylate, and allyl glycidyl ether.

The composition is preferably formulated as a low VOC, high solids composition having a total solids content of about 40-70% by weight at the time of application.

The present disclosure is based on the discovery that use of clearcoat compositions including certain polymers enables the composition to form a smooth finish in combination with primer and basecoating layers, when the primer, basecoat, and clearcoat are applied in a wet on wet on wet ("3 wet") manner, while still providing an aesthetic appearance and film properties such as chip resistance and solids content and film builds equal to that of conventional baked primers.

Also included within the scope of this disclosure is a substrate, such as a vehicle body or part thereof, coated by the method and with the coating composition disclosed herein.

The present disclosure is especially useful for finishing the entire exterior body of automobiles and trucks and parts thereof.

In this disclosure, a number of terms and abbreviations are used. The following definitions are provided.

"Wet-on-wet" means that an overlying coat is applied to an underlying coat without curing (i.e., baking) or completely drying the underlying coat. "Wet-on-wet-on-wet", also used interchangeably herein with "three layer wet", "3 wet", and "3-coat-1-bake", means that the primer layer, basecoat layer, and clearcoat layer are applied successively in a wet-on-wet manner.

"Essentially free" with respect to the primer coating shall mean that the primer coating composition contains less than 1% by weight, preferably zero percent by weight, of the specified component, based on the total weight of the composition.

"High solids composition" means a low solvent solvent-borne liquid coating composition having a total solids content at time of application of at least 40 percent, preferably in the range of from 40-70 percent, in weight percentages based on the total weight of the composition. It should be understood that "total solids" refers to the total amount of non-volatile components in the composition even though some of the components may be non-volatile liquids rather than solids at room temperature.

"Low VOC composition" means a coating composition that has less than about 0.6 kilogram of organic solvent per liter (5 pounds per gallon) of the composition, preferably in the range of less than about 0.42 kilogram of organic solvent per liter (3.5 pounds per gallon), as determined under the procedure provided in ASTM D3960.

Primer Coated Layer

The primer composition includes a film forming primer binder wherein the film forming primer binder includes or consists essentially of in the range of from 20 to 90 percent by weight of the polyester and in the range of from 10 to 80 percent by weight of a crosslinking agent. In other embodiments, the film forming primer binder includes or consists essentially of in the range of from 25 to 75 percent by weight of the polyester and in the range of from 25 to 75 percent by weight of a crosslinking agent, and in still further embodiments, the film forming primer binder can include in the range of from 30 to 70 percent by weight, of the polyester and in the range of from 30 to 70 percent by weight of a crosslinking agent. The percentages by weight are based on the total weight of the film forming primer binder.

Other film forming primer binders can be used with the polyester and the crosslinking agent. In some embodiments, suitable other film forming primer binders can include, for example, polyurethanes, polyethylene glycol, polypropylene glycol, polytrimethylene ether glycol, linear and/or branched acrylics and acrylic polyols, acrylic latexes, aqueous latexes, acrylic microgels, aqueous microgels or a combination thereof. The other film forming primer binders, if present, can be present in the range of from 1 to 30 percent by weight. In other embodiments, the other film forming primer binders can be present in the range of from 5 to 25 percent by weight, and in still further embodiments, can be present in the range of from 10 to 20 percent by weight. All percentages by weight are based on the total weight of the film forming primer binder. Suitable crosslinking agents can include, for example, melamines, amino resins, polyisocyanates, blocked polyisocyanates or a combination thereof. In some embodiments, the primer coating composition is free from or essentially free from acrylic latexes, aqueous latexes, acrylic microgels, aqueous microgels or combinations thereof.

The primer coating composition can further include additives that are common for primers. Suitable additives can include, for example, pigments, rheology control agents, UV absorbers, light stabilizers, catalysts, surfactants, antifoam agents or combinations thereof.

Pigments suitable for use in a primer composition are well known in the art. Suitable pigments can include, for example, carbon black, titanium dioxide, iron oxides, silicon dioxide, zinc phosphate, barium sulfate, other colorants common in the art or a combination thereof. The pigment to film forming binder ratio, sometimes called the pigment to binder ratio or p/b ratio can be in the range of from 20/100 to 200/100. In other embodiments, the p/b ratio can be in the range of from 30/100 to 150/100, and, in still further embodiments, can be in the range of from 40/100 to 100/100.

In order to cure the applied compositions, the coating compositions can contain from about 0.1 to 2.0%, based on the weight of film forming binder, of a strong acid catalyst, or amine salt thereof. In one embodiment, the catalyst is amino-methyl propanol blocked dodecyl benzyl sulfonic acid, available as NACURE® 5225 or 3525 acid catalysts both available from King Industries, Norwalk, Conn. Phosphoric acid, and salts thereof, are also effective catalysts.

The primer coating composition can have a solids content in the range of from 25 to 80 percent by weight. In other embodiments, the solids content can be in the range of from 35 to 70 percent by weight and in still further embodiments, the solids content can be in the range of from 40 to 60 percent by weight. As used herein, the phrase "solids content" means the total amount of non-water and non-solvent ingredients in the coating composition. The primer coating composition can have liquid carrier ingredients other than water. In some embodiments, the liquid carrier is greater than 50 percent by weight water, and in other embodiments, the liquid carrier is greater than 60 percent by weight water, based on the total amount of liquid carrier.

Base Coated Layer

The basecoat composition includes a film forming basecoat binder wherein the film forming basecoat binder includes or consists essentially of in the range of from 10 to 60 percent by weight of the polyester, in the range of from 0 to 70 percent by weight of an acrylic latex and in the range of from 10 to 50 percent by weight of a crosslinking agent. In other embodiments, the film forming basecoat binder includes or consists essentially of in the range of from 15 to 55 percent by weight of the polyester, in the range of from 10 to 60 percent by weight of an acrylic latex and in the range of from 15 to 40 percent by weight of a crosslinking agent, and in still further embodiments, the film forming basecoat binder can include or consist essentially of in the range of from 20 to 50 percent by weight of the polyester, in the range of from 20 to 50 percent by weight of an acrylic latex and in the range of from 17 to 25 percent by weight of a crosslinking agent. The percentages by weight are based on the total weight of the film forming basecoat binder.

In some embodiments, the basecoat composition can utilize the same or a different polyester than was used in the primer composition. If the polyester is not the same polyester as was used in the primer composition, it is produced under the parameters previously discussed. The basecoat composition and the primer composition are formulated differently due to the need for these two compositions to resist intermixing and to provide the necessary properties that primers and basecoats are expected to provide to a multilayer coating.

The acrylic latex can include in the range of from 0 to 70 percent by weight of the basecoat composition, wherein the percentage by weight is based on the total amount of film forming binder. Acrylic latexes are well known in the art and can be produced by the polymerization of a monomer mixture according any of the known methods. In some methods, Suitable monomers that can be used in the monomer mixture include (meth)acrylic acids and esters, for example, (meth)acrylic acid, methyl (meth)acrylate, ethyl (meth)acrylate, propyl(meth)acrylate, butyl(meth)acrylate, and 2-ethylhexyl(meth)acrylate, hydroxyalkyl(meth)acrylates, hydroxyethyl(meth)acrylates, hydroxypropyl(meth)acrylates or a combination thereof. Suitable other monomers can include vinyl acetate, vinyl propionate, acrylonitrile, styrene and vinyl toluene. Acrylic latex resins typically have internal crosslinking. In order to impart the internal crosslinking, a portion of the monomer mixture can include monomers that have two polymerizable ethylenically unsaturated groups such as, for example, ethylene glycol di(meth)acrylate, 1,6-hexane diol di(meth)acrylate, allyl (meth)acrylate or divinylbenzene. In other embodiments, the monomer mixture can include monomers carrying pairs of chemical groups which can be caused to react with one another either during or after the polymerization reaction, such as epoxy and carboxyl, for example, glycidyl methacrylate and (meth)acrylic acid; anhydride and hydroxyl, for example, maleic anhydride and hydroxyethyl(meth)acrylate; or isocyanate and hydroxyl, for example, 2-isocyanatoethyl (meth)acrylate and hydroxyethyl(meth)acrylate.

Other film forming basecoat binders can be used with the polyester and the optional acrylic latex. In some embodiments, suitable other film forming basecoat binders can include, for example, polyurethanes, polyethylene glycol, polypropylene glycol, polytrimethylene glycol linear and branched acrylics and acrylic polyols, aqueous latexes, acrylic microgels, aqueous microgels or combinations thereof. Crosslinking agents can also be used as part of the film forming basecoat binder. Suitable crosslinking agents can include, for example, melamines, amino resins, polyisocyanates, blocked polyisocyanates or a combination thereof.

The basecoat composition can further include additives that are common for basecoats. Suitable additives can include, for example, pigments, rheology control agents, UV absorbers, light stabilizers, catalysts, antifoam agents or combinations thereof. Pigments suitable for use in a basecoat composition are well known in the art and can include, for example, carbon black, titanium dioxide, iron oxides, silicon dioxide, zinc phosphate, barium sulfate, azo pigments, phthalocyanine pigments, quinacridone pigments, pyrrolopyrrole pigments, perylene pigments, pearlescent pigments, metal oxide coated metal pigments, titanium dioxide coated aluminum, coated mica or pearl flakes, titanium dioxide coated mica, graphite effect pigments, plate-like iron oxide, plate-like copper phthalocyanine pigments or a combination thereof. The basecoat composition can have a p/b ratio in the range of from 2/100 to 150/100. In other embodiments, the p/b ratio can be in the range of from 3/100 to 100/100 and, in still further embodiments, can be in the range of from 8/100 to 75/100.

The basecoat composition can have a solids content in the range of from 10 to 50 percent by weight. In other embodiments, the solids content can be in the range of from 15 to 40 percent by weight and in still further embodiments, the solids content can be in the range of from 17 to 35 percent by weight. As used herein, the phrase "solids content" means the total amount of non-water and non-solvent ingredients in the coating composition. The primer coating composition can have liquid carrier ingredients other than water. In some embodiments, the liquid carrier is greater than 50 percent by weight water, and in other embodiments, the liquid carrier is greater than 60 percent by weight water, based on the total amount of liquid carrier.

Clear Coated Layer

The clearcoat composition of the present disclosure includes a copolymer of (meth)acrylate monomers that is co-polymerized with a mixture of other acrylic or methacrylic monomers including styrene, some of which preferably have carboxylic acid-functionality. The monomer mixture is essentially free of hydroxyl functionality. The term "(meth)acrylate" as used herein refers to both acrylate and methacrylate. Polymers include both oligomers of relatively low molecular weight and polymers of relatively high molecular weight. The term "copolymers" is contemplated to include oligomers and polymers polymerized from more than one kind of monomer.

It will be appreciated that the term "functional," as used in this description, refers to the potential for crosslinking to occur after formation of a polymeric emulsion with an external crosslinking agent.

In a preferred embodiment, the copolymer of the present clearcoat composition has at least one monomer unit including the condensation product of an ethylenically unsaturated carboxylic acid group and glycidyl ester of a mixture of tertiary acids having 9 to 11 carbon atoms having at least one methyl group on the α-carbon. In an alternate preferred embodiment, at least one monomer unit includes the polymerization product of the condensation product of a polymerizable glycidyl ester or ether and a mixture of tertiary acids having 9 to 11 carbon atoms having at least one methyl group on the α-carbon. Mixtures of tertiary acids having 9 to 11 carbon atoms having at least one methyl group on the α-carbon are available under the trademark VERSATIC™ acid, and the glycidyl ester of VERSATIC™ acid (also commonly called neodecanoic acid) is available under the brand name CARDURA® Resin E-10 from Shell Oil Company. Examples of polymerizable acids include, without limitation, acrylic acid, methacrylic acid, crotonic acid, fumaric acid, maleic acid, and itaconic acid, and anhydrides and monoalkyl esters of the difunctional acids. Examples of polymerizable glycidyl esters and ethers include, without limitation, glycidyl acrylate, glycidyl methacrylate, and allyl glycidyl ether.

In one preferred embodiment, the acrylic polymer has an equivalent weight of up to about 650 grams/equivalent, more preferably up to about 520 grams/equivalent, still more preferably up to about 435 grams/equivalent, more preferably up to about 370 grams/equivalent, and most preferably up to about 350 grams/equivalent. The acrylic polymer preferably has an equivalent weight of at least about 260 grams/equivalent, more preferably at least about 290 grams/equivalent, and still more preferably at least about 310 grams/equivalent. The acrylic polymer preferably has equivalent weight in the range of 260 to 650 grams/equivalent, more preferably 290 to 520 grams/equivalent, still more preferably 290 to 435 grams/equivalent, even more preferably 290 to 370 grams/equivalent, and most preferably 310 to 350 grams/equivalent.

In various embodiments, the present disclosure provides polymerization of a monomer mixture that includes at least one carboxylic acid-functional monomer or at least one monomer that has a group that is converted to an acid group following polymerization, such as an anhydride group. Examples of acid-functional or anhydride-functional monomers include, without limitation, α,β-ethylenically unsaturated monocarboxylic acids containing 3 to 5 carbon atoms such as acrylic, methacrylic, crotonic acids, and optionally, the esters of those acids; α,β-ethylenically unsaturated dicarboxylic acids containing 4 to 6 carbon atoms and the anhydrides, monoesters such as maleic anhydride, maleic acid monomethyl ester, and fumaric acid, and optionally, the diesters of those acids; monomers containing a carboxyl group: sorbic, cinnamic, vinyl furoic, tetra hydro phthalic anhydride, α-chlorosorbic, p-vinylbenzoic, maleic, fumaric, aconitic, atropic, and itaconic acids; and acid-functional derivatives of copolymerizable monomers, such as the hydroxyethyl acrylate half-ester of an anhydride, such as succinic acid. Other preferred half esters include lower alkyl esters containing 1 to 6 carbon atoms such as itaconic acid monomethyl ester, butyl acid itaconate, methyl acid fumarate, butyl acid fumarate, methyl acid maleate and butyl acid maleate.

In various embodiments, an acid-functional monomer is preferably included in an amount from about 5% to about 25% by weight of the monomers being polymerized, and preferably from about 12% to about 25% by weight of the monomers being polymerized.

Acid-functionality may also be provided by other known means, such as by reaction of an hydroxyl group with a cyclic anhydride or by hydrolysis of an ester, such as by hydrolysis of a tert-butyl methacrylate monomer unit. Alternately, it may be preferred to include an acid-functional monomer such as acrylic acid, methacrylic acid, or crotonic acid, or an anhydride monomer such as maleic anhydride or itaconic anhydride that may be hydrated after polymerization to generate acid groups.

The acrylic polymer may be polymerized using further co-monomers. These include styrene, alpha methyl styrene, isobornyl (meth) acrylate, and diacrylates, such as hexane diol diacrylate. Further representative examples of suitable esters of acrylic, methacrylic, and crotonic acids include, without limitation, those esters from reaction with saturated aliphatic and cycloaliphatic alcohols containing 1 to 20 carbon atoms, such as methyl, ethyl, propyl, isopropyl, n-butyl, isobutyl, tert-butyl, 2-ethylhexyl, lauryl, stearyl, cyclohexyl, trimethylcyclohexyl, tetrahydrofurfuryl, stearyl, sulfoethyl, and isobornyl acrylates, methacrylates, and crotonates. Representative examples of other ethylenically unsaturated polymerizable monomers include, without limitation, such compounds as fumaric, maleic, and itaconic anhydrides, monoesters, and diesters with alcohols such as methanol, ethanol, propanol, isopropanol, butanol, isobutanol, and tert-butanol. Representative examples of polymerization vinyl monomers include, without limitation, such compounds as vinyl acetate, vinyl propionate, vinyl ethers such as vinyl ethyl ether, vinyl and vinylidene halides, and vinyl ethyl ketone. Representative examples of aromatic or heterocyclic aliphatic vinyl compounds include, without limitation, such compounds as styrene, α-methyl styrene, vinyl toluene, tert-butyl styrene, and 2-vinyl pyrrolidone. In addition, the monomers may also contain silane functionality. The co-monomers may be used in any combination.

The acrylic polymer or polymers may be prepared using conventional techniques, such as by heating the monomers in the presence of a polymerization initiating agent and optionally chain transfer agents. The polymerization is preferably carried out in solution, although it is also possible to polymerize the acrylic polymer in bulk.

The solvent or solvent mixture is generally heated to the reaction temperature and the monomers and initiator(s) and optionally chain transfer agent(s) are added at a controlled rate over a period of time, typically from about two to about six hours. The polymerization reaction is usually carried out at temperatures from about 20° C. to about 200° C. The reaction may conveniently be done at the temperature at which the solvent or solvent mixture refluxes, although with proper control a temperature below the reflux may be maintained. The initiator should be chosen to match the temperature at which the reaction is carried out, so that the half-life of the initiator at that temperature should preferably be no more than about thirty minutes, more preferably no more than about five minutes. Additional solvent may be added concurrently. The mixture is usually held at the reaction temperature after the additions are completed for a period of time to complete the polymerization. Optionally, additional initiator may be added to ensure complete conversion of monomers to polymer.

Typical initiators are organic peroxides such as dialkyl peroxides such as di-t-butyl peroxide, peroxyesters such as t-butyl peroctoate and t-butyl peracetate, peroxydicarbonates, diacyl peroxides, hydroperoxides such as t-butyl hydroperoxide, and peroxyketals; azo compounds such as 2,2'azobis(2-methylbutanenitrile) and 1,1'-azobis(cyclohexanecarbonitrile); and combinations of these. Typical chain transfer agents are mercaptans such as octyl mercaptan, n- or tert-dodecyl mercaptan; halogenated compounds, thiosalicyclic acid, mercaptoacetic acid, mercaptoethanol, and dimeric alpha-methyl styrene.

The acrylic polymer or polymers should have a weight average molecular weight of at least about 2,400, preferably at least about 3,000, more preferably at least about 3,500, and particularly preferably at least about 4,000. Weight average molecular weight may be determined by gel permeation chromatography using polystyrene standard. In addition, the weight average molecular weight is preferably up to about 5,000, more preferably up to about 4,750, and still more preferably up to about 4,500.

A solvent may be utilized in the coating composition used in the practice of the present disclosure. In general, the solvent can be any organic solvent and/or water. In the preferred embodiment, the solvent includes a polar organic solvent. More preferably, the solvent includes one or more organic solvents selected from polar aliphatic solvents or polar aromatic solvents. Still more preferably, the solvent includes a ketone, ester, acetate, aprotic amide, aprotic sulfoxide, or a combination of any of these. Examples of useful solvents include, without limitation, methyl ethyl ketone, methyl isobutyl ketone, m-amyl acetate, ethylene glycol butyl ether acetate, propylene glycol monomethyl ether acetate, xylene, N-methylpyrrolidone, blends of aromatic hydrocarbons, and mixtures of these. In a different embodiment, the solvent is water or a mixture of water with possibly small amounts of co-solvents.

In a preferred embodiment, the coating composition has a viscosity is 200 centipoise or less. Coating compositions at this viscosity can be applied using the same application equipment as is used with traditional high solids coating technology. Accordingly, the monomers used to prepare the acrylic or other polymer are selected and apportioned to achieve the desired viscosity, and in conjunction therewith the molecular weight of the polymer and the solvent or solvent blend are likewise selected to achieve the desired viscosity.

The volatile organic content (VOC) of the coating composition, as measured according to EPA Method 24, is preferably about 3.5 lbs/gal or less, more preferably about 3.2 lbs/gal or less, and even more preferably about 3.0 lbs/gal or less. The VOC is minimized as much as possible by using the minimum amount of organic solvent to obtain the desired viscosity.

The coating composition preferably contains one or more crosslinking agents that react with the acrylic polymer after the coating composition is applied to form a cured coating. The crosslinking agents have two or more groups reactive with the polymer. The crosslinker may be monomeric, oligomeric, or polymeric. Examples of suitable crosslinking agents include, without limitation, aminoplast crosslinkers. The aminoplast crosslinker is advantageously a monomeric, preferably partially alkylated, particularly preferably partially methylated, melamine formaldehyde resin. Melamine formaldehyde resins having imino content are also useful, as are polymeric melamines.

The clearcoat composition includes preferably at least about 10% by weight, more preferably at least about 15% by weight, of the crosslinker, based on the nonvolatile vehicle. "Non-volatile vehicle" refers to the film forming components. In preferred embodiments, the crosslinker is at least about 5%, more preferably at least about 10% by weight of the nonvolatile vehicle. It is also preferred for the crosslinker to be up to about 40%, more preferably up to about 30% by weight of the nonvolatile vehicle. The crosslinker is preferably from about 5% to about 40%, more preferably from about 10% to about 35%, and still more preferably from about 15% to about 35% by weight of the nonvolatile vehicle.

The clearcoat coating composition may include one or more catalysts to enhance the cure reaction, and preferably include at least one catalyst for the aminoplast curing agent reaction and one catalyst for the polyisocyanate curing agent reaction. Suitable catalysts for the aminoplast curing agent reactions include, without limitation, alkylsulfonic acids, arylsulfonic acid, and alkylarylsulfonic acids, such as methane sulfonic acid, β-toluene sulfonic acid, dinonylnaphthalene disulfonic acid, dodecylbenzenesulfonic acid; phosphoric acid and its esters such as phenyl acid phosphate, butyl phosphate, and hydroxy phosphate esters; monobutyl maleate, boron trifluoride etherate, trimellitic acid, and triflic acid. Strong acid catalysts are often blocked, e.g. with an amine.

Additional agents, for example surfactants, stabilizers, wetting agents, rheology control agents, fillers, pigments, colorants, fungicides, dispersing agents, adhesion promoters, UV absorbers, hindered amine light stabilizers, and the like as known to those skilled in the art of coating formulations may be included and are contemplated as within the scope of the disclosure. While such additives are well-known in the prior art, the amount used must be controlled to avoid adversely affecting the coating characteristics.

Substrate

The method for forming a multi-layer coating of the present disclosure may be applied to various substrates such as metals, plastics and foamed bodies, and combinations thereof, preferably to metal surfaces and moldings, and more preferably to metal products on which cationic electrodeposition coated film has been formed.

Examples of the metal substrates include iron, copper, aluminum, tin, zinc and the like and alloys containing these metals, such as steel. Specific products include bodies and parts of automobiles such as passenger cars, trucks, motorcycles and buses.

The metal substrates that are particularly preferred are those preliminarily subjected to forming treatment with phosphate salt, chromate salt, or the like.

The substrate may have an electrodeposition coated film on the surface subjected to forming treatment. The electrodeposition coated film may be formed from an anionic or a cationic electrodeposition coating material. However, a cationic electrodeposition coating material is preferred since it provides excellent corrosion resistance.

Examples of plastic substrates that can be coated according to the method of the present disclosure include polyester reinforced fiberglass, reaction-injection molded urethanes, partially crystalline polyamides, and the like or mixtures thereof, which may be primed or unprimed or otherwise treated as well prior to treating by the coating method described herein. These plastic substrates are oftentimes used in fabricating specific automotive body parts, such as fenders, bumpers, and/or trim parts.

Method for Forming a Multi-Layer Coating

According to the method for forming a multi-layer coating of the present disclosure, as exemplified in FIG. 1, a layer of a primer coating composition 12 is formed on a substrate (automobile body 10 shown in FIG. 1) using the primer coating composition, then a layer of a base coating composition 14 is formed using the base coating composition and a layer of a clear coating composition 16 is formed using the clear coating composition in this order in the wet-on-wet manner. An optional pre-bake or heated flash process 13 is employed after the primer 12 is added, and a required prebake or heated flash process 15 is employed for the primer/basecoat combination before clearcoat is applied.

According to the present disclosure, when the three coating compositions described above are applied to automobile bodies, conventional coating methods such as spraying, electrostatic spraying, high speed rotational electrostatic bells, and the like, can be conducted. The preferred techniques for applying all three coating compositions are air atomized spraying with or without electrostatic enhancement, and high speed rotary atomizing electrostatic bells, since these techniques are typically employed in modern automobile and truck assembly plants.

When the primer coating composition is applied to automotive bodies according to the present disclosure, any of the above techniques can be used.

The primer coating composition forms a cured coating layer having a thickness of usually 0.3 to 2.5 mils (7 to 60 ∞m), preferably 0.5 to 1.5 mils (12 to 36 µm), but it may vary according to the intended use. If the thickness is more than the upper limit, image sharpness may deteriorate or a trouble such as unevenness or sagging may occur at the time of application. If it is less than the lower limit, the electro-primed substrate cannot be hidden, and film discontinuity may occur, which could expose the lower electrocoat layer to excess UV transmission and degradation.

On the layer of uncured primer coating composition, a layer of base coating composition and a layer of clear coating composition are applied in the wet-on-wet manner to form a base coated layer and a clear coated layer. The basecoat can be applied to the primer after an ambient primer flash of varying time, or after a heated flash thereof. The layer of base coating composition may be applied, like the primer coating material, using air-electrostatic spray coating or a rotary atomizing electrostatic bell so as to have a dry thickness of 0.4 to 1.2 mils (10 to 30 µm).

The layer of clear coating composition is then applied on the base coated layer, for the purpose of smoothing roughness or glittering which occurs due to the presence of luster color pigment and for protecting a surface of the base coated layer. The clear coating composition may be applied, like the base coating composition, using the rotary atomizing electrostatic bells. The clear coated layer is preferably formed so as to have a cured thickness of about 1.0 to 3.0 mils, (25-75 µm).

The multi-layered coating obtained as described above are then cured (i.e., baked) simultaneously, as shown in FIG. 1, to form a layered coated film. This is what we call "three-coat-one-bake method". This method requires no oven for drying the primer coated layer before being base coated (which is required in the conventional process shown in FIG. 2), and is favorable from the economical and the environmental viewpoint.

The multi-layered coating is cured in a curing oven at a curing temperature within the range of 100 to 180° C., preferably 130 to 160° C., so as to obtain a cured coated film with high crosslinking density. The curing time may vary depending on the curing temperature, however, a curing time of 10 to 30 minutes is adequate when the curing temperature is 130° C. to 160° C.

According to the process of the present disclosure, the multi-layered coating is formed so as to have a thickness of 3 to 5 mils (75 to 120 µm). It is important to have an adequate film build in each of the layers of the present disclosure, as a low film build will affect the appearance, mechanical properties, and the amount of UV transmittance to the underlying layers. Too low a film build can allow UV radiation to penetrate to the electrocoated layer. Most electrocoat layers are not formulated with UV absorbers and they tend to be very susceptible to UV degradation.

The following examples further illustrate the present disclosure, however, these are not to be construed as limiting the present disclosure to their details.

TABLE 1

Compositions

| | Formula Weight | | | Non-Volatiles (1) | | |
|---|---|---|---|---|---|---|
| | Level of ACE ™ (hydroxyl acrylate) Monomer in Resin | | | | | |
| Component[1] | 0% ACE Control Clearcoat | 50% ACE Comparative Clearcoat A | 100% ACE Comparative Clearcoat B | 0% ACE Control Clearcoat | 50% ACE Comparative Clearcoat A | 100% ACE Comparative Clearcoat B |
| RESIMENE CE-4514 available from Ineos Melamines | 19.41 | 19.41 | 19.41 | 18.25% | 18.25% | 18.25% |
| Butanol available from Dow Chemical | 7.04 | 7.04 | 7.04 | 7.04 FW | 7.04 FW | 7.04 FW |
| Aeorsil R805 VV90 from Evonik Degussa dispersed in a conventional acrylic polymer[3] | 3.04 | 3.04 | 3.04 | 0.28% silica | 0.28% silica | 0.28% silica |
| Leveling Agent Disparlon LC-955 available from King Ind. | 1 | 1 | 1 | 0.10% | 0.10% | 0.10% |
| Aromatic 100 available from Exxon Mobil Corporation | 4.14 | 4.14 | 4.14 | 4.14 FW | 4.14 FW | 4.14 FW |
| Tinuvin 928 available from BASF Corporation | 1.18 | 1.18 | 1.18 | 1.18% | 1.18% | 1.18% |
| Tinuvin 123 available from BASF Corporation | 0.6 | 0.6 | 0.6 | 0.60% | 0.60% | 0.60% |
| Control Resin (described above) | 25.61 | — | — | 18.20% | — | — |
| Modified Acrylic A (50%) | — | 25.608 | — | — | 18.20% | — |
| Modified Acrylic B (100%) | — | — | 25.608 | — | — | 18.20% |
| Non-Aqueous Dispersion Resin (NAD)[2] | 24.21 | 24.21 | 24.21 | 14.53% | 14.53% | 14.53% |
| Nacure 3525 available from King Industries | 2.18 | 2.179 | 2.179 | 0.52% | 0.52% | 0.52% |
| Ethyl 3-Ethoxy Propionate available from Dow Chemical | 13.04 | 3.57 | 1.13 | 13.0 FW | 3.57 FW | 1.13 FW |

[1]All values in this table show the amount of non-volatiles unless otherwise noted as percent formula weight (FW)
[2]Non-aqueous dispersion resin (NAD) prepared in accordance with the procedure described in the U.S. Pat. No. 5,747,590 at column 8, lines 46-48 and column 9, lines 1-25, all of which is incorporated herein by reference.
[3]Ground dispersion after mixing 9% Aeorsil R805 VV90, 55% of an hydroxylic solvent and 36% conventional acrylic resin.

The coating compositions can be applied via a 3-wet application method. The 3-wet method comprises of the steps of: 1. applying at least one layer of a commercially available waterborne primer that is 3-wet capable; i.e., can provide a firm foundation to hold the basecoat and clearcoat under typical 3-wet application conditions. The 3-wet waterborne primer used here is commercially available from Axalta Coating Systems and sold under the trade line-numbers of 1572 or 1442. 2. applying at least one layer of a waterborne basecoat that is 3-wet capable; i.e., capable of lying on top of the wet waterborne primer with no intermixing and laying smoothly enough to provide a good surface for when the clearcoat is applied. The 3-wet capable waterborne basecoats used here are commercially available from Axalta Coating Systems and sold under the trade line numbers of 1582 or 1484. For the coatings applied here, the process was: By electrostatic spray method, apply primer at indicated film build, let stand (flash) for 4.5 minutes at ambient temperature, then spray the waterborne basecoat at the indicated film build, let stand (flash) for 1.5 minutes followed by a short drying bake of 3 minutes at 180 F. The clearcoat is then applied electrostatically at the indicated film build, flashed for 7.5 minutes and the three layers baked together for 30 minutes at 285 F in a gas-fired oven. Appearance measurements can be applied once the test panels have cooled to room temperature.

TABLE 2

Comparative Data Black Waterborne Basecoat - Level of ACE in Resin

| | Combined Ford Number (CF) (Vertical/Horizontal) | | | |
|---|---|---|---|---|
| | Waterborne Primer (1) Black 3-Wet Waterborne Basecoat (2) | | | |
| | Control Clearcoat | Comparative Clearcoat A | Comparative Clearcoat B | Conclusion |
| Horizontal | 75.5 | 80.5 | 80.6 | improved horizontal panel appearance at higher percent Non-Volatiles |
| Vertical | 54.1 | 57.7 | 54.2 | |
| Clearcoat Percent Non-Volatiles | 52.6 | 55.1 | 57.5 | |

(1) primer film build = 1.0 +/− 0.1 mil
(2) basecoat film build = 0.6 +/− 0.05 mil
3. clearcoat film build = 1.80 +/− 0.1 mil

TABLE 3

Comparative Data Silver Waterborne Basecoat - Level of ACE in Resin

Combined Ford Number (CF) (Vertical/Horizontal)

Waterborne Primer (1)
Silver 3-Wet Waterborne Basecoat (2)

| | Control Clearcoat | Comparative Clearcoat A | Comparative Clearcoat B | Conclusion |
|---|---|---|---|---|
| Horizontal | 47.9 | 55.6 | 54.8 | improved horizontal and vertical panel appearance at higher percent Non-Volatiles |
| Vertical | 47.2 | 50.3 | 52.1 | |
| Clearcoat Percent Non-Volatiles | 52.6 | 55.1 | 57.5 | |

(1) primer film build = 1.0 +/− 0.1 mil
(2) basecoat film build = 0.55 +/− 0.1 mil
3. clearcoat film build = 1.80 +/− 0.1 mil

TABLE 4

Comparative Data Silver Waterborne Basecoat - Primary vs. Secondary Hydroxyl Resin Combined Ford Number (CF) (Vertical/Horizontal)

Waterborne Primer (1)
Silver 3-Wet Waterborne Basecoat (2)

| | Control Clearcoat with control control primary OH/normal mol wt. | Control Clearcoat with 100% primary OH and higher mol wt | Conclusion 100% ACE (secondary OH) at higher molecular weight |
|---|---|---|---|
| Horizontal | 47.9 | 51.6 | 55.3 improved horizontal and vertical panel appearance with 100% secondary OH vs. primary OH at higher percent Non-Volatiles |
| Vertical | 47.2 | 46.1 | 49 |
| Clearcoat Percent Non-Volatiles | 52.6 | 54.4 | 57.5 |

(1) primer film build = 1.0 +/− 0.1 mil
(2) basecoat film build = 0.55 +/− 0.1 mil
3. clearcoat film build = 1.80 +/− 0.1 mil Accordingly, the foregoing examples exhibit improved appearance with regarding to the preparations in accordance with the present disclosure as compared to those previously known in the art.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for forming a three-layer coating consisting of the steps of:
   sequentially applying three compositions, in a wet-on-wet-on-wet manner, consisting of: a layer of a primer coating composition, a layer of a base coating composition, and a layer of a single clear coating composition on a substrate, wherein the single clear coating composition comprises: a film forming binder and an organic liquid carrier, wherein the film forming binder comprises a copolymer that consists of (meth)acrylate monomer units and acid-functional monomer units, wherein at least one monomer unit of the (meth)acrylate monomers units is the condensation product of an ethylenically unsaturated carboxylic acid group and glycidyl ester of a mixture of tertiary acids having 9 to 11 carbon atoms having at least one methyl group on the α-carbon, wherein the balance of the monomer units of the (meth)acrylate monomers are selected from the group consisting of: styrene, alpha methyl styrene, isobornyl (meth) acrylate, hexane diol diacrylate, and wherein the clear coating composition is formulated as a low VOC, high solids composition having a total solids content of about 40% to about 70% by weight at the time of application; and
   simultaneously curing the applied three wet layers by baking.

2. The method of claim 1, wherein applying the layer of the primer coating composition comprises applying a composition comprising 25 to 75 percent by weight of a polyester and 25 to 75 percent by weight of a crosslinking agent.

3. The method of claim 1, wherein applying the layer of the base coating composition comprises applying a composition comprising 20 to 50 percent by weight of a polyester, 20 to 50 percent by weight of an acrylic latex, and 17 to 25 percent by weight of a crosslinking agent.

4. The method of claim 1, wherein sequentially applying comprises applying to primer coating composition directly to the substrate, applying the base coating composition directly over the primer coating composition, and applying the clear coating composition directly over the base coating composition.

5. The method of claim 4, wherein each of the primer coating layer, the base coating layer, and the clear coating layer remain uncured until the step of simultaneously curing is performed.

6. The method of claim 5, wherein the step of simultaneously curing comprises exposing the substrate and the applied three layers to a curing temperature of 130 to 160 degrees Celsius.

7. The method of claim 6, wherein the step of simultaneously curing comprises exposing the substrate and the applied three layers to the curing temperature for a time period of 10 to 30 minutes.

8. The method of claim 1, wherein the ethylenically unsaturated carboxylic acid group is selected from the group consisting of: acrylic acid, methacrylic acid, crotonic acid, fumaric acid, maleic acid, itaconic acid, and mixtures thereof.

9. The method of claim 1, wherein at least one monomer unit of the acid-functional monomer units is a carboxylic acid-functional monomer or a monomer that has a group that is converted to an acid group following polymerization.

10. The method of claim 9, wherein the carboxylic acid-functional monomer or the monomer that has a group that is converted to an acid group following polymerization is selected from the group consisting of: α,β-ethylenically unsaturated monocarboxylic acids containing 3 to 5 carbon atoms; α,β-ethylenically unsaturated dicarboxylic acids containing 4 to 6 carbon atoms and the anhydrides, monoesters, and diesters of those acids; monomers containing a carboxyl group; acid-functional derivatives of copolymerizable monomers; and mixtures thereof.

11. The method of claim 10, wherein the carboxylic acid-functional monomer is about 5 to about 25 percent by weight of the monomers being polymerized in the copolymer.

12. The method of claim 1, wherein the clear coating composition further comprises a crosslinking agent.

13. The method of claim 1, wherein the substrate comprises a metal substrate or a plastic substrate.

* * * * *